United States Patent
Campoy Cervera et al.

(10) Patent No.: US 9,369,879 B2
(45) Date of Patent: Jun. 14, 2016

(54) METHOD FOR AVOIDING INTERFERENCES IN FREQUENCY DIVISION DUPLEX OPERATING AREAS

(75) Inventors: Luis Campoy Cervera, Madrid (ES);
Quiliano Perez Tarrero, Madrid (ES);
Pilar Ruiz Aragon, Madrid (ES);
Primitivo Matas Sanz, Madrid (ES)

(73) Assignee: Telefonica, S.A., Madrid (ES)

( * ) Notice: Subject to any disclaimer, the term of this patent is extended or adjusted under 35 U.S.C. 154(b) by 217 days.

(21) Appl. No.: 14/004,540

(22) PCT Filed: Mar. 7, 2012

(86) PCT No.: PCT/EP2012/053946
§ 371 (c)(1),
(2), (4) Date: Nov. 6, 2013

(87) PCT Pub. No.: WO2012/123310
PCT Pub. Date: Sep. 20, 2012

(65) Prior Publication Data
US 2014/0050128 A1   Feb. 20, 2014

(30) Foreign Application Priority Data

Mar. 11, 2011   (ES) .................................. 201130338

(51) Int. Cl.
*H04W 16/14* (2009.01)
*H04W 72/04* (2009.01)
(Continued)

(52) U.S. Cl.
CPC .......... *H04W 16/14* (2013.01); *H04W 72/0426* (2013.01); *H04W 92/12* (2013.01); *H04W 72/0433* (2013.01); *H04W 84/045* (2013.01)

(58) Field of Classification Search
None
See application file for complete search history.

(56) References Cited

U.S. PATENT DOCUMENTS

| 7,116,647 B2 * | 10/2006 | Uebayashi ............ H04W 36/14 370/329 |
| 2005/0174954 A1 * | 8/2005 | Yun ....................... H04W 16/32 370/310 |
| 2013/0336178 A1 * | 12/2013 | Tiirola et al. .................. 370/280 |

FOREIGN PATENT DOCUMENTS

| EP | 2 161 964 A1 | 3/2010 |
| WO | 2010/100526 A1 | 9/2010 |

OTHER PUBLICATIONS

Nokia Siemens Networks et al., "Inter eNB over-the-air communication (OTAC) for LTE-Advanced", 3GPP TSG RAN WG1 #57 Meeting, May 2009, 6 pgs.
(Continued)

Primary Examiner — Omar Ghowrwal
(74) Attorney, Agent, or Firm — Sughrue Mion, PLLC

(57) ABSTRACT

The method comprises coordinating the use of radio resources between different network elements including a macro base station and SCENs deployed in the coverage area of the macro base station, operating in FDD mode, by means of the sending of messages between part or all of the network elements through a synchronized TDD air interface, unidirectionally, by broadcasting, or bidirectionally, through dedicated channels.

The system comprises:
  several network elements including:
    a macro base station operating in FDD mode; and
    a plurality of SCENs deployed within the coverage area of the macro base station and also operating in FDD mode;
and
  means for coordinating the use of radio resources between different network elements by the sending of messages between part or all of the network elements through a synchronized TDD air interface.

8 Claims, 14 Drawing Sheets

(51) Int. Cl.
*H04W 92/12* (2009.01)
*H04W 84/04* (2009.01)

(56) References Cited

OTHER PUBLICATIONS

3rd Generation Partnership Project; Technical Specification Group Radio Access Network; Evolved Universal Terrestrial Radio Access (E-UTRA); FDD Home eNode B (HeNB) Radio Frequency (RF) requirements analysis (Release 9), 3GPP TR 36.921, V9.0.0 (Apr. 2010), 46 pages.
International Search Report for PCT/EP2012/053946 dated May 18, 2012.
3rd Generation Partnership Project; Technical Specification Group Radio Access Network; High Speed Downlink Packet Access (HSDPA); Overall description; Stage 2 (Release 9); 3GPP TS 25.308 V9.5.0 (Mar. 2011), 66 pages.
3rd Generation Partnership Project; Technical Specification Group Radio Access Network; Synchronisation in UTRAN Stage 2 (Release 9); 3GPP TS 25.402 V9.0.1 (Mar. 2011), 51 pages.
3rd Generation Partnership Project; Technical Specification Group Radio Access Network; UTRAN architecture for 3G Home Node B (HNB); Stage 2 (Release 10); 3GPP TS 25.467 V10.1.0 (Mar. 2011), 54 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9); 3GPP TS 36.300 V9.7.0 (Mar. 2011), 174 pages.
3rd Generation Partnership Project; Technical Specification Group GSM/EDGE Radio Access Network; General Packet Radio Service (GPRS); Overall description of the GPRS radio interface; Stage 2 (Release 10), 3GPP TS 43.064 V10.0.0 (Sep. 2010), 105 pages.
3rd Generation Partnership Project; Technical Specification Group Radio Access Network; Evolved Universal Terrestrial Radio Access Network (E-UTRAN); X2 application protocol (X2AP) (Release 10); 3GPP TS 36.423 V10.7.0 (Sep. 2013), 132 pages.
3rd Generation Partnership Project; Technical Specification Group Radio Access Network; Evolved Universal Terrestrial Radio Access (E-UTRA); Requirements for support of radio resource management (Release 10); 3GPP TS 36.133 V10.20.0 (Sep. 2015), 729 pages.
3rd Generation Partnership Project; Technical Specification Group Radio Access Network; Evolved Universal Terrestrial Radio Access (E-UTRA); Physical Channels and Modulation (Release 10); 3GPP TS 36.211 V10.7.0 (Feb. 2013), 101 pages.
Interference Coordination and Cancellation for 4G Networks; LTE Part II 3GPP Release 8; IEEE Communications Magazine Apr. 2009, 8 pages.

\* cited by examiner

METHOD FOR AVOIDING INTERFERENCES IN FREQUENCY DIVISION DUPLEX OPERATING AREAS

CROSS REFERENCE TO RELATED APPLICATIONS

This application is a National Stage of International Application No. PCT/EP2012/053946 filed Mar. 7, 2012, claiming priority based on Spanish Patent Application No. 201130338 filed Mar. 11, 2011, the contents of all of which are incorporated herein by reference in their entirety.

FIELD OF THE ART

The present invention generally relates, in a first aspect, to a method for avoiding interferences in Frequency Division Duplex (FDD) operating areas, comprising coordinating the use of radio resources between different FDD network elements, including macro base stations and short range coverage extension nodes (SCENs), and more particularly to a method which comprises using a synchronized Time Division Duplex (TDD) air interface for performing said coordination.

A second aspect of the invention comprises a system for avoiding interferences in FDD operating areas, which is adapted for implementing the method of the first aspect.

This invention is focused on a novel mechanism for the coordination of RR (Radio Resource) usage among macro cellular FDD base stations (namely NodeB and eNodeB in 3G/4G systems respectively) and FDD SCEN (Short range Coverage Extensions Nodes) as Relays, Picocells and Femtocells (namely HeNodeB in LTE terminology), providing also a novel mechanism for SCEN frequency and time synchronization.

PRIOR STATE OF THE ART

The 4G systems trend to simplify the core network improving the latency, capacity and throughput. This represents an important improvement for IP traffic and services.

It is important to note that the use of SCEN is foreseen as a must in the cellular network industry, in order to fulfil the requirements of dynamic flexible and fair coverage in the full cellular area, pursuing as main objectives:

High transmission capabilities to hot spots, homes and enterprises, improving the coverage at cell borders, and remarkably in indoor scenarios.

Traffic offloads from macro cells, with the potential of very big increase of the full cellular network aggregate throughput and the area spectral efficiency ASE (b/s/Hz/ $m^2$).

Flexible coverage deployment "on demand".

On the other hand, it is foreseen that these extension nodes (SCEN) use the same frequency of the macro base station in which coverage area these devices are deployed, and therefore an interference problem could be present, hindering somehow the compliance of the objectives pursued by the SCENs. In order to avoid these issues some strategies should be implemented to get the upmost benefit with the deployment of SCENs.

In the current state of the art of these technologies, which can be consulted in current Release 9/Release 10 of 3GPP, interference avoidance mechanisms among base station and SCENs (since both devices operate in the same pair frequencies) have three different approaches:

Rely on pure statistical basis, reusing full available radio resources by SCENs as if no interference with macro cells will occur, due to the limited amount of radiated power by SCEN, and the capability of HARQ in case of collision.

Interference avoidance mechanisms based on macro cell signals measurements by the SCEN, in order to take them into account for SCEN RR usage.

Use of the backhaul network for ICIC messages among macro cells and SCEN, in order to coordinate the use of the RR among them.

These approaches, particularized for 4G systems, are currently being implemented by SCEN vendors in commercial and laboratory prototypes with different specific variations. As FIG. 2 shows, in the first case there is not any interference avoidance mechanism and the probability that BS and SCEN use the same radio resources causing interferences increases according to the number of users in the coverage area. However the other two approaches contemplate certain coordination mechanism to interference avoidance by means of measurements done by SCEN on BS's signals (B approach), or by means of messages interchanged between BS and SCEN through backhaul communications such as X2 interface currently contemplated for 4G systems (C approach).

As an example of the state of the art concerning the technologies origin of the proposed invention it might be interesting to describe the ICIC message which has been defined in [2], for load management through the backhaul interface X2 currently specified for LTE (4G system). This protocol provides, among other things, the management of the load in the area covered by several eNodeBs. The coordination is implemented by means of the load indication procedure which basically consists of sending LOAD INFORMATION message individually from the macro BS to each of its neighbouring cells (so far till a maximum of 256 neighbour cells are contemplated) indicating resource status, overload and traffic load. The purpose of this procedure is to control the interferences between neighbouring cells, and the following table shows the information elements (IE) related to interference coordination included in the LOAD INFORMATION message according to [2].

| IE name | Presence | Brief description |
| --- | --- | --- |
| UL Interference Overload Indication | Optional | Per PRB, provides a report on interference overload, indicating the interference level experienced by the indicated cell on all resource blocks. Each PRB is identified by its position in a certain list. |
| UL High Interference Indication | Mandatory | Per PRB, provides a second level report on interference issue, indicating the occurrence of high interference sensitivity, as seen from the sending eNB. Each position in the bitmap represents a PRB (value "1" indicates high interference sensitivity and value "0" indicates low interference sensitivity). The receiving eNB should try to avoid scheduling cell edge UEs in its cells for the concerned PRBs. |
| Relative Narrowband Tx Power (RNTP) | Optional | Per PRB, provides an indication on DL power restriction and other information needed for interference aware scheduling. It indicates, per PRB, whether downlink transmission power is lower than the value indicated by the RNTP Threshold IE included in RNTP element. |

Note that the State of the art simply provides indication of those PRBs where the base station has detected some problem (reactive approach).

Related with SCEN synchronization, the state of the art is based on the use of external references by air interface (from in band signal, from other cellular systems with best coverage or from GPS signals), or the use of backhaul signals (using techniques based on the standard IEEE 1588 [6] or SynEthernet) in case of no coverage on any of the mentioned air interface signals. Here backhaul network also called transport network means the portion of the hierarchical telecommunication network comprising the links between the core network (backbone) and the radio access network.

Next, it will be introduced a brief definition of those technical terms which are fundamental for the correct understanding of the invention, facilitating the reading of the present specification:

Base station: a cell site or base station refers to a geographical point where one or several transmitters/receivers equipped with one or several antennas are located.

Radio frame: a radio frame is a numbered time interval of certain duration used for data transmission on the radio physical channel. A radio frame in LTE (4G system) is 10 ms duration, divided into 20 time slots of 0.5 ms duration. For WCDMA (3G system) the duration of the radio frame is also of 10 ms, but in this case divided into 15 time slots. The unit of data that is mapped to a radio frame (10 ms time interval) may also be referred to as radio frame.

Radio resource (RR): a radio resource unit can be defined by the set of basic physical transmission parameters necessary to support a signal waveform transporting end user information corresponding to a reference service. It is important to note that these physical transmission parameters depend strongly on the multiple access technique being used. For example, in FDMA (Frequency Division Multiple Access), a radio resource unit is equivalent to a certain bandwidth within a given carrier frequency, in TDMA (Time Division Multiple Access), a radio resource unit is equivalent to a pair of a carrier frequency and a time slot, in CDMA (Code Division Multiple Access), a radio resource unit is defined by a carrier frequency, a code sequence and a power level. The main difference arising in CDMA is that the required power level necessary to support a user connection is not fixed but depends on the interference level. Thus, the amount of transmitted power resources will vary along time according to multiple elements of the scenario, such as propagation conditions, interference, cell load level, etc. In addition to the main physical dimensions (frequency, time slot, code sequence and power level), there are other physical transmission elements such as the modulation scheme, channel coding scheme, etc. Clearly, depending on the exploitation of the basic dimensions in terms of the former elements different spectral efficiencies may follow. Nevertheless, for the conceptual definition of a radio resource unit, only the referred main transmission parameters will be retained.

Radio Resource Control (RRC): a sub-layer of radio interface Layer 3 of OSI (Open System Interconnection) model existing in the control plane only which provides information transfer service to the non-access stratum. RRC is responsible for controlling the configuration of radio interface Layers 1 and 2.

Radio resource management (RRM) is the system level control of co-channel interference and other radio transmission characteristics in wireless communication systems, for example cellular networks, wireless networks and broadcasting systems. RRM involves strategies and algorithms for controlling parameters such as transmit power, channel allocation, handover criteria, modulation scheme, error coding scheme, etc. The objective is to utilize the limited radio spectrum resources and radio network infrastructure as efficiently as possible. RRM concerns multi-user and multi-cell network capacity issues, rather than point-to-point channel capacity.

Traditional telecommunications research and education often dwell upon channel coding and source coding with a single user in mind, although it may not be possible to achieve the maximum channel capacity when several users and adjacent base stations share the same frequency channel.

Efficient dynamic RRM schemes can increase system capacity by an order of magnitude, which often is considerably more than what is possible by introducing advanced channel coding and source coding schemes.

RRM is especially important in systems limited by co-channel interference rather than by noise, for example cellular systems and broadcast networks homogeneously covering large areas, and wireless networks consisting of many adjacent access points that may reuse the same channel frequencies.

The cost of deploying a wireless network is normally dominated by base station sites (real estate costs, planning, maintenance, distribution network, energy, etc) and sometimes also by frequency license fees. The objective of radio resource management is therefore typically to maximize the system spectral efficiency in bit/s/Hz/base station site or Erlang/MHz/site, under constraint that the grade of service should be above a certain level. The latter involves covering a certain area and avoiding outage due to co-channel interference, noise, attenuation caused by long distances, fading caused by shadowing and multipath, Doppler shift and other forms of distortion. The grade of service is also affected by blocking due to admission control, scheduling starvation or inability to guarantee the quality of service demanded by the users.

Pico/Femtocell: Those are devices used to improve mobile network coverage in small areas. They connect locally to mobile phones and similar devices through their normal GSM, UMTS or LTE connections, and then route the connections over a fixed broadband connection back to the carrier, bypassing the normal cell towers that are arrayed across the countryside. Pico/Femtocells require no special hardware or software support on the mobile devices they connect to.

Relay station (RS): a relay station is a network element with relaying capabilities that is wirelessly connected to an AP, another RS and/or a UT and that uses the same radio technology (RAT mode) for all its connections. Relays are seen as essential part of next generation mobile radio network to reach cost efficient and fast network rollout. Relays do not have a wired connection to the backhaul. Instead, they store the data received wirelessly from the BS and forward to the user terminals, and vice versa. Thus, the costs of the backplane that serves as the interface between the BS and the wired backhaul network can be eliminated for a relay. In general, relaying systems can be classified as either decode-and-forward or amplify-and-forward systems. In decode-and-forward schemes, where relays are also referred to as digital repeaters, bridges, or routers, the relay nodes regenerate the signal by fully decoding and re-encoding the signals prior to retransmission. By contrast, in amplify-and-forward systems the relays essentially act as analogue repeaters, thereby increasing the systems noise level. Unless otherwise stated, decode-and-forward systems are considered as the majority of proposed concepts are of this class, and they are generally considered to be more viable with respect to implementation. The use of relay nodes is a promising idea to increase the data rates available to edge-of-cell users, or to increase coverage at a given data rate. Relaying technology has been much studied in academia, resulting in improved understanding of its potential impact on overall system spectral efficiency.

Radio Network Planning: radio network planning can be defined as designing a network structure and its configuration to meet certain quality requirements. There may be a number of criteria defined by the operator, and usually these differ from service's providers. The criteria can take into account such topics as coverage, Quality of Service (QoS), equipment and other costs, revenues from network operation and can be used to verify the network quality either by the engineer (manual decision) or by the software (automated decision).

The key role of a proper radio network planning and optimization is to reduce any negative influence of interference and hence to achieve a maximum cell decoupling or isolation. One or more tools should assist the network planner in the whole planning process, covering dimensioning, detailed planning and, finally, pre-launch network optimization. Planning of radio networks is a complex process. Typically planners are specialized to a few sub-processes. Radio network planning is an important but only small part of network operations. Interaction with other software tools is crucial for efficiency.

Inter-cell interference coordination (ICIC): In OFDMA systems, it is useful to think of inter-cell interference as a collision between resource blocks. In such collision models, the overall system performance is determined by the collision probabilities and the impact of a given collision on the signal-to-interference-and-noise (SINR) ratio associated with the colliding resource blocks. Accordingly, ICIC mechanisms target to reduce the collision probabilities and to mitigate the SINR degradation that such collisions may cause. For instance, neighbouring cells may have some cell specific preferences for different subsets of resource blocks, or neighbouring cells may employ reduced power for colliding resource blocks. The goal of ICIC is to improve cell coverage and increase cell edge throughput. Inter-Cell Interference Coordination (ICIC) can enhance the data rates of cell edge users, while its effectiveness depends on the system load and the way it is distributed inside the cells. ICIC aims at applying restrictions to the downlink resource management in a coordinated way between cells. These restrictions can be either on the available resources of the resource manager or can be in the form of restrictions on the transmit power that can be applied to certain radio resources. Such restrictions in a cell will provide the possibility for improvement in SINR, and consequently to the cell-edge throughput and coverage.

Inter-cell Interference Co-ordination (ICIC) requires also communication between different network nodes in order to set and reconfigure these restrictions. Two cases are considered so far, the static one where reconfiguration of the restrictions is done on a time scale corresponding to days and the semi-static where the time scale is much smaller and corresponds to seconds.

Time Division Duplexing (TDD): TDD is the application of time-division multiplexing to separate outward and return signals. It emulates full-duplex communication over a half-duplex communication link. If there is asymmetry of the uplink and downlink data rates, TDD systems can be adapted allocating more RR to the traffic direction with highest requirements.

Frequency Division Duplexing (FDD): FDD are systems in which the transmitter and receiver operate at different carrier frequencies. Therefore nodes and UEs must be able to send and receive RF signals at the same time. This mode of operation is referred to as duplex mode. Uplink and downlink sub-bands are said to be separated by the frequency offset. FDD systems require less time synchronization among nodes than TDD, and are more efficient in scenarios of symmetric traffic. In this scenarios TDD wastes bandwidth during the switch-over from transmitting to receiving.

Problems with Existing Solutions:

The interference coordination solutions in SCEN deployments, currently being used or under research, have the following lacks from the interference avoidance point of view:

1. Statistical approaches lead to a collision among macro cells and SCEN, diminishing the radio communication capabilities, and creating de facto a hole in macro cell coverage area. This approach has also scalability problems since interference among several SCENs could also be present. In massive deployments of this kind of nodes there is more probability that the coverage areas of different SCENs are overlapped and also overlapping of users served by the base station.

2. Interference avoidance mechanisms based on macro cell signals measurements cannot guarantee an efficient use of the RR. There are several scenarios, mainly for dynamic scheduling (usually applied when the traffic is bursty and dynamic in rate), in which this approach fails because the allocation of radio resources could change every radio frame (10 ms) leading to interference problems, since SCEN devices cannot be aware of the real interference level at macro cell or UEs. Besides, it should be considered that the SCENs are deployed in areas with coverage problems and so the level of signal from the macro BS usually will be very weak, decreasing the efficiency of the method.

3. The ICIC approach, based on backhaul utilization, lacks deployment flexibility since the deployment of a new SCEN requires to establish a new connection with the base station, and cannot adapt "on the air" to the interference levels present in the coverage area. This is a semi-static approach, due to the asynchronous high level messages used, and therefore waste available RR by static assignment of them independently of the real RR usage.

On the other hand, the two previously mentioned mechanisms for providing synchronization to SCEN present the following implementation issues:

If on the air synchronization is used, the coverage of air signals represents a major barrier (mainly for indoor installations), that makes preventing it from utilization in most cases.

If cable based synchronization is used, it would be necessary to include a new module (HW/SW) in each node of the backhaul network. Besides its functionality could be impacted by the backhaul network load.

DESCRIPTION OF THE INVENTION

It is necessary to offer an alternative to the state of the art which covers the gaps found therein, particularly those related to the lack of flexibility that known interference coordination procedures based on the use of ICIC messages have.

Note that said known procedures representative of the more advanced technology of State of the art simply provides indication of those PRBs where the base station has detected some problem, i.e. constituting a reactive approach.

For that purpose, the present invention provides, in a first aspect, a method for avoiding interferences in FDD operating areas, comprising coordinating the use of radio resources between different network elements including at least one macro base station and SCENs deployed within the coverage area of said macro base station and operating in FDD mode, by means of the sending of messages between at least part of said network elements.

Unlike the above described ICIC proposal where that sending of messages was done through a backhaul network in a reactive approach, the method of the first aspect of the invention comprises, in a characteristic manner, performing said sending of messages by means of a synchronized Time Division Duplex, or TDD, air interface.

With the present invention the interference coordination procedure is implemented in the synchronous TDD air interface, and so it provides a totally flexible solution for new deployments or changes in RR usage.

The method of the first aspect of the invention enables the use of time advanced pre-schedule, based on previous scheduling information analysis (DL assignment messages and UL grant messages) generated by the scheduler block of the base station. Therefore sending through a synchronized TDD air interface in broadcast or dedicated mode to the involved SCENs (deployed in the coverage area of the base station), the list of radio resources that could be used in the next radio frame (10 ms) to avoid interferences in DL and UL (proactive approach)

For an embodiment related to a multicast version of the proposed invention SCEN to SCEN interference is solved since the base station, knowing the geographical position of each SCEN, uses said information to indicate individually the most appropriate radio resources to be used by each of them in order to avoid interference with the neighbouring nodes. In the case of interference to users served by the base station, the broadcast version of the invention would be enough to avoid the problem.

The proposed invention is based on the scheduling information produced during a certain period of time (several radio frames), and provides indication of those radio resources that can be used by the SCENs since the base station has the engagement of not use them in the next radio frame, excluding the guaranteed resources to the SCENS in its dynamic scheduling process.

Further to the effect of avoiding interferences by means of the method of the first aspect of the invention, the use of the added TDD air interface provides also the effect of achieving the synchronization of the SCEN with the base station. In addition to the frequency synchronism, with the present invention, the SCEN can also achieve time synchronism, enabling a better control of the interferences as there is a perfect alignment between the radio frames of base station and SCENs.

Since TDD mode in this invention is used only for interference coordination of the FDD nodes, the radio power of the TDD signal (which uses a frequency different to the used by FDD system), could be increased so that the communication through the TDD interface can be extended even for indoor installations.

Other embodiments of the method of the first aspect of the invention are described according to appended claims, and in a subsequent section related to the detailed description of several embodiments.

It is to be noted that the implementation of this invention in one cell (NodeB or eNodeB) and all or part of the SCENS deployed under its coverage area, does not require any modification on the rest of the network nodes nor in any of the user equipment A second aspect of the invention concerns to a system for avoiding interferences in FDD operating areas, comprising:
one or more macro base stations operating in FDD mode;
a plurality of SCENs deployed within the coverage area of said one or more macro base stations and also operating in FDD mode; and
coordination means for coordinating the use of radio resources between different network elements, including said one or more macro base stations and said SCENs, by sending messages between part or all of said network elements.

Unlike the known proposals, in the system of the second aspect of the invention the coordination means comprise a synchronized TDD air interface through which perform said sending of messages.

The system of the second aspect of the invention is adapted to implement the method of the first aspect.

Other embodiments of the system of the second aspect of the invention are described according to appended claims, and in a subsequent section related to the detailed description of several embodiments.

BRIEF DESCRIPTION OF THE DRAWINGS

The previous and other advantages and features will be more fully understood from the following detailed description of embodiments, with reference to the attached drawings (some of which have already been described in the Prior State of the Art section), which must be considered in an illustrative and non-limiting manner, in which.

DETAILED DESCRIPTION OF SEVERAL EMBODIMENTS

Next, a description of the invention for several embodiments will be done, referring the appended Figures.

It is necessary to clarify that for 3G systems such as WCDMA the frequency reuse pattern is 1, using all the cells the same carrier and bandwidth (5 MHz, for single carrier systems) but with different scrambling codes. Therefore the counterpart for different subcarrier frequencies (F1, F2) used in 4G systems for interference avoidance, would be in 3G systems the different channelization codes for DL and different scrambling codes for UL, since in DL channelization codes are used to distinguish different channels from same base station while in UL, scrambling codes distinguish different users.

Besides, the radio resources scheduler in 3G base stations (NodeB) is included in the external control node RNC, common at several BSs, and so the implementation of the present invention should interact with the allocation messages produced by the RNC, making more difficult the understanding of the invention. However, in 4G systems (which access technology is based on the use of OFDMA for DL and SC-FDMA for UL) the resources scheduling are a function of the base station (the eNodeB includes the functionality of the RNC), allocating different time frequency slots (PRBs) for different users. For these two reasons, although the invention is applied to both systems, 3G and 4G, depending on the embodiment, the next described details of the implementation will be focused on LTE systems.

The main focus of the invention is to provide a method to perform a coordinated use of FDD systems radio resources among macrocell and SCENs. A method is sought for improving synchronization reference for SCEN devices. It is noted that the extrapolation of this invention could lead to a use of TDD radio transmission as a medium for the X2 interface.

The invention is applicable to any FDD cellular deployment, namely 3G and 4G cellular systems, in which relays or femtocells nodes are foreseen, to increase system capacity or system coverage. Some of the terminologies used are from 4G systems, only for clarity of the exposition, but the same principle is applicable to 3G systems or any other cellular FDD system.

The invention consists on the use of TDD communications in order to coordinate the use of FDD RR among SCENs and between SCENs and macro cells, as well as for the provision of synchronization reference for SCEN devices.

Figure 1A:
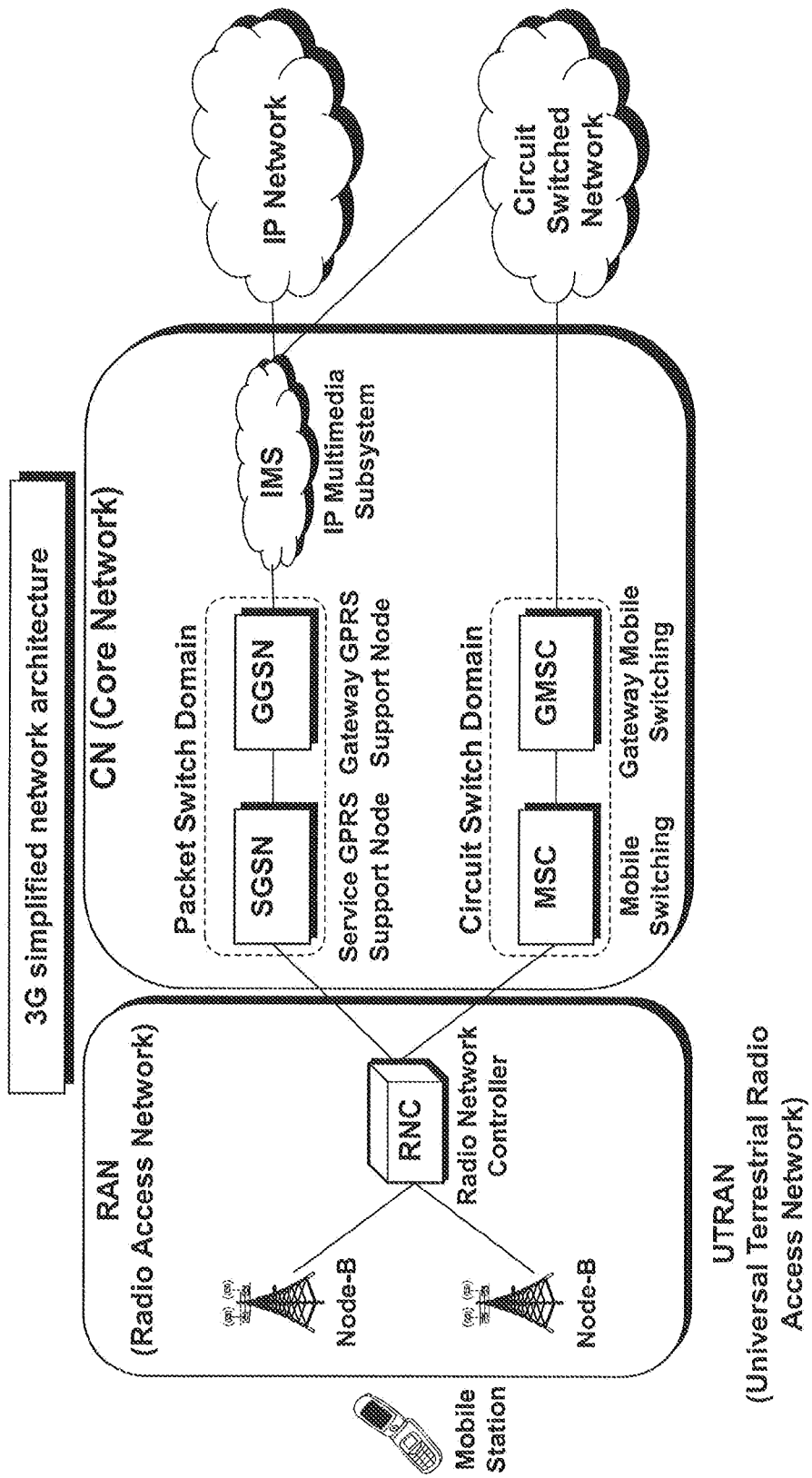
FIG. 1a shows a 3G network architectures model.
Figure 1B:
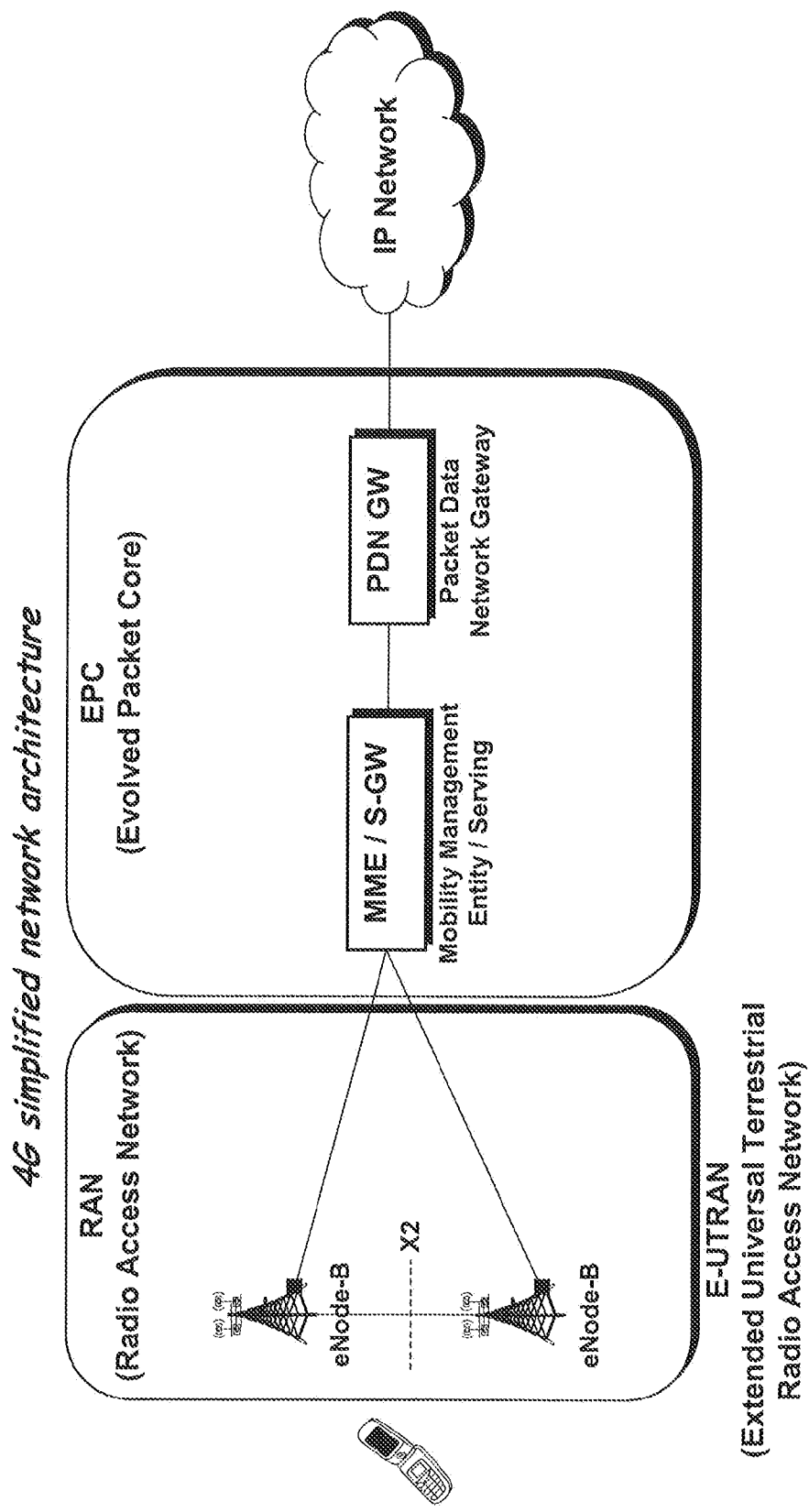
FIG. 1b shows a 4G network architectures model.
Figure 2:
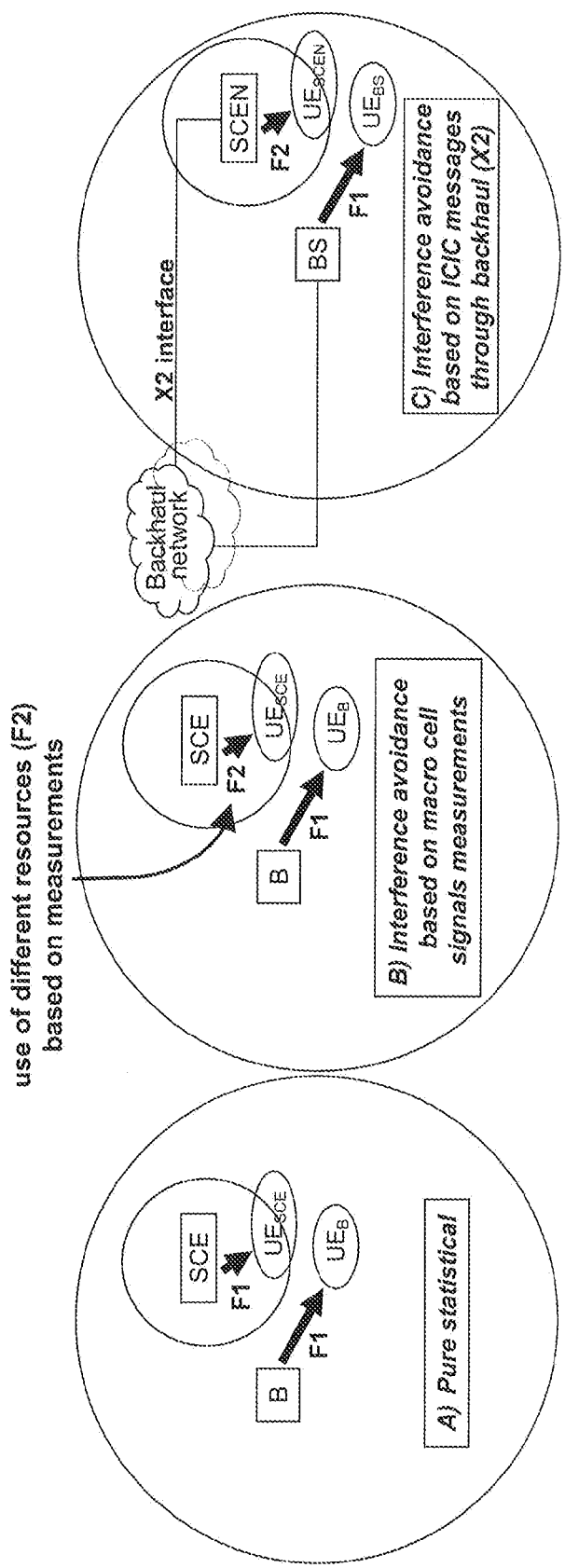
FIG. 2 shows different approaches for interference avoidance between base station and extension nodes SCENs, representative of the state of the art.
Figure 3:
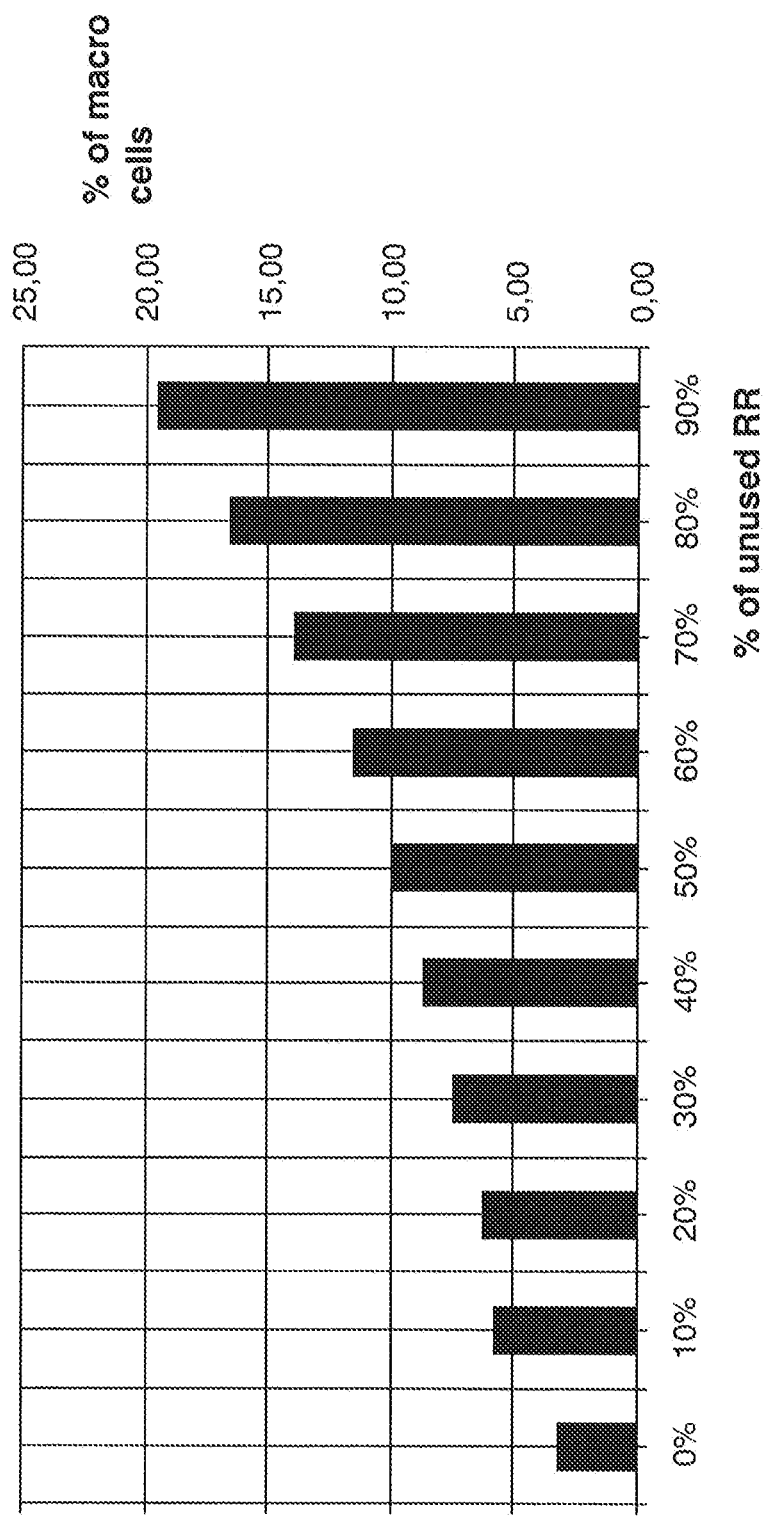
FIG. 3 is an exemplary graph showing the percentage of macro cells for % free RR in the busy hour.

The invention empowers the system with a coordinated joint sharing of FDD RR between macro cells and SCENs, enabling the transfer of unused macro RR to the SCENs on a radio frame by radio frame basis. It should be considered that macro cell capacity is usually planned to attend the traffic requirements foreseen in the busy hour. In the busy hour, only a percentage of available RR is used in order to avoid system congestion. In FIG. 3 example statistics of unused RR in different macro cells at the busy hour and for high number of samples are shown.

It has to be noted that even when a small portion of the sampled macro cells are using fully its RR (in the graphic samples using more than 95% of its RR are included in the 0% unused RR column) this is only due to the current lack of adequate QoS mechanisms in order to diminish the impact of P2P users on RR availability. Anyhow, the graphic shows that currently more than 70% of the macro cells, even in the busy hour, have more than 50% of its RR unused, and obviously in an average hour this number will be much higher.

Precisely, the proposed invention takes great advantage of this fact, enforcing to the SCENs camped in the coverage area of a given base station to use the radio resources unused or guaranteed by this base station, so that the interference between users of macro cell and SCENs can be avoided.

Figure 4:
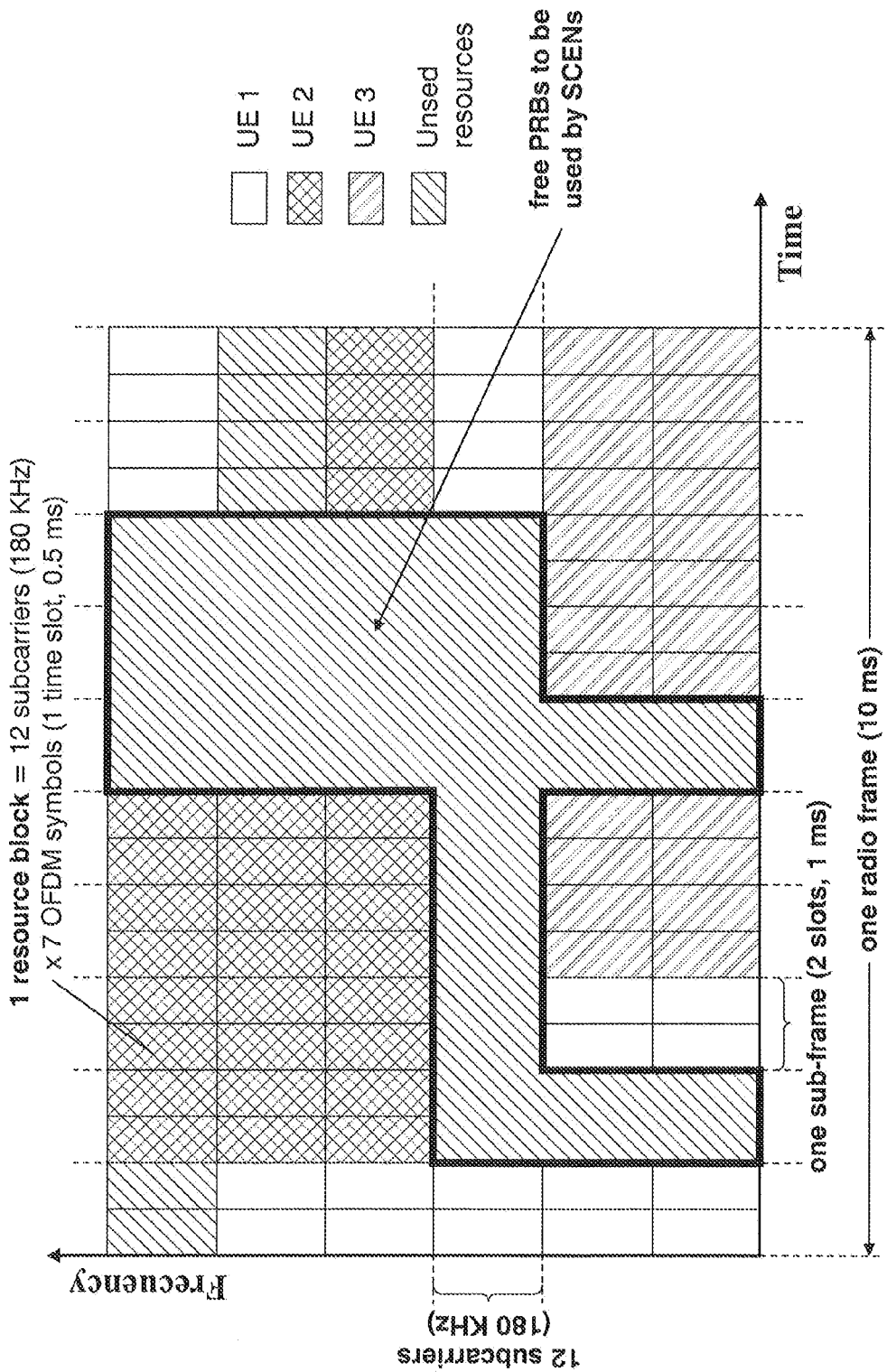
FIG. 4 shows an example of allocation of PRBs (time-frequency grid) for a DL LTE signal of 1.4 MHz.

The invention, based on the information related to the allocation of radio resources by the base station for its own users, estimates the portion of the resource grid (e.g. in LTE frequencies and time slots) which could be used in the next radio frame by the users of the SCENs. It should be noted that Almost Blank Subframes (ABS) is a specific case of this kind of assignments in which only time slots are assigned covering all frequency bandwidth. As shown in FIG. 4, the DL resources grid in LTE, represented by a group of physical resource blocks (a PRB is the smallest element of resource allocation assigned by the BS scheduler), for a signal of 1.4 MHz of bandwidth. The allocation of resources among the users of the cell is a function of the scheduler of the BS and in LTE may be dynamic (when traffic is bursty and dynamic in rate) or persistent (when traffic is small, periodic and semi-static in size as VoIP). Regardless the type of scheduling, according to data shown in FIG. 3, in all the radio frames there are many free resources as FIG. 4 illustrates. The aim of the proposed invention is to reserve part of the unused resources by the BS, for the exclusive use of the users served by the SCENs in the coverage area of the BS, avoiding possible interferences between the active UEs of the BS and the active UEs of the SCENs. With the dedicated version of the invention (bidirectional communications between the base station and the SCENs) it can be avoided even the possible interferences produced between FDD users of overlapped SCENs.

This invention takes advantage of the same frame duration among FDD and TDD protocols in cellular systems (as specified for instance in 3GPP TS 36.211 [5] for LTE standard), and the great amount of identical component blocks among both protocols, that will enable the use of synergies, that simplifies radio access nodes (SCENs and macro cells) designs.

This enables the use of TDD protocol (which is deployed in a third frequency different from FDD UL and DL frequencies) to synchronously communicate to SCEN devices, and eventually to the other macro cells, the RR available that are not foreseen to be used in next radio frame by the macro cell.

TDD could also establish a P2P communication among macro cell and SCEN devices in its coverage area, providing a two way mechanism for interchange of signalling information in a master slave way, being the RR usage commanded by macro cells, and reports on performance of assigned RR usage sent from SCENs to macro cell.

Figure 5:
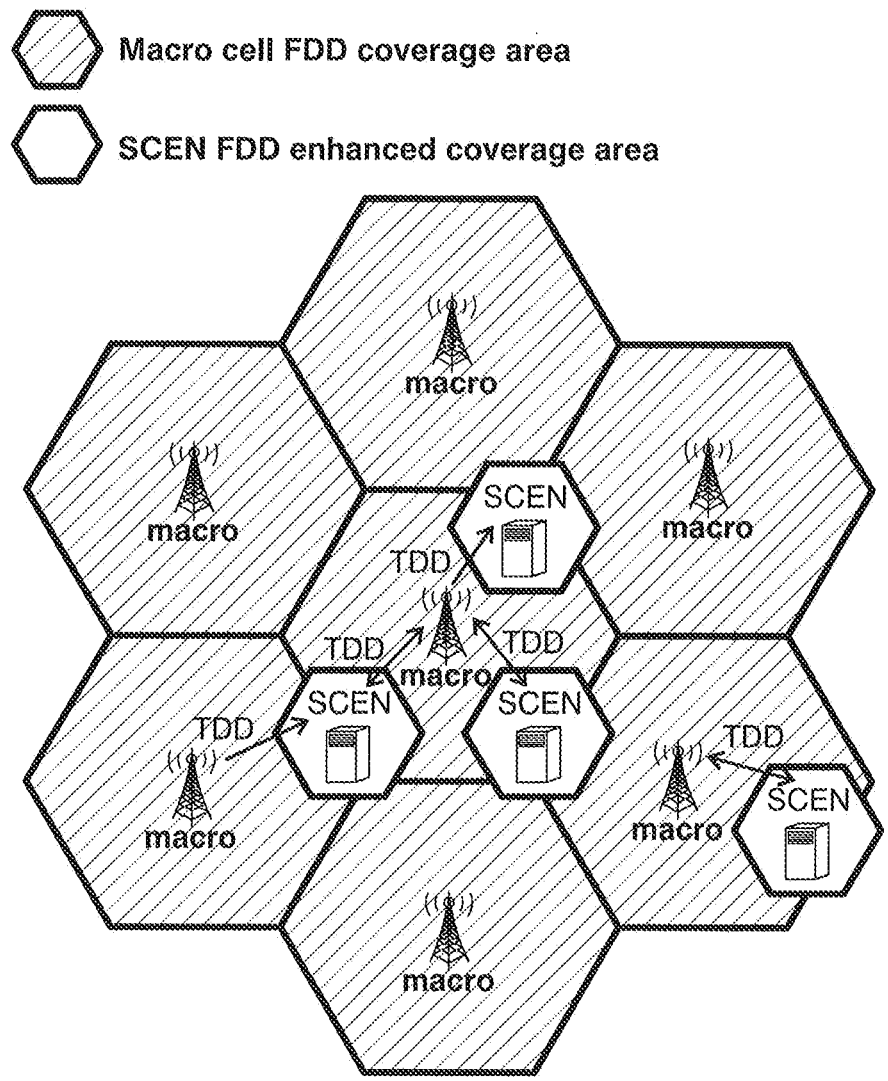
FIG. 5 shows a general network architecture for the deployment of the system and method of the invention.

In FIG. 5 a general cellular network architecture is shown, on which TDD transmission is depicted to illustrate the invention concept, i.e., use of TDD as control channel for RR coordinated usage between macro cells and SCENs. The figure indicates that the deployment of this invention requires that some nodes of the FDD deployed Network (namely some macro cells and some SCENs) be TDD capable, to be established between them a control channel. TDD capable means that an additional TDD transceiver operating in a frequency band different from the FDD bands is included in the nodes, together with appropriate signal processing HW and SW to take advantage of its capabilities.

It is worthy to note that the innovation deployment is flexible, by that meaning that its deployment in one cell does not imply or preclude its deployment in other cells.

Figure 6:
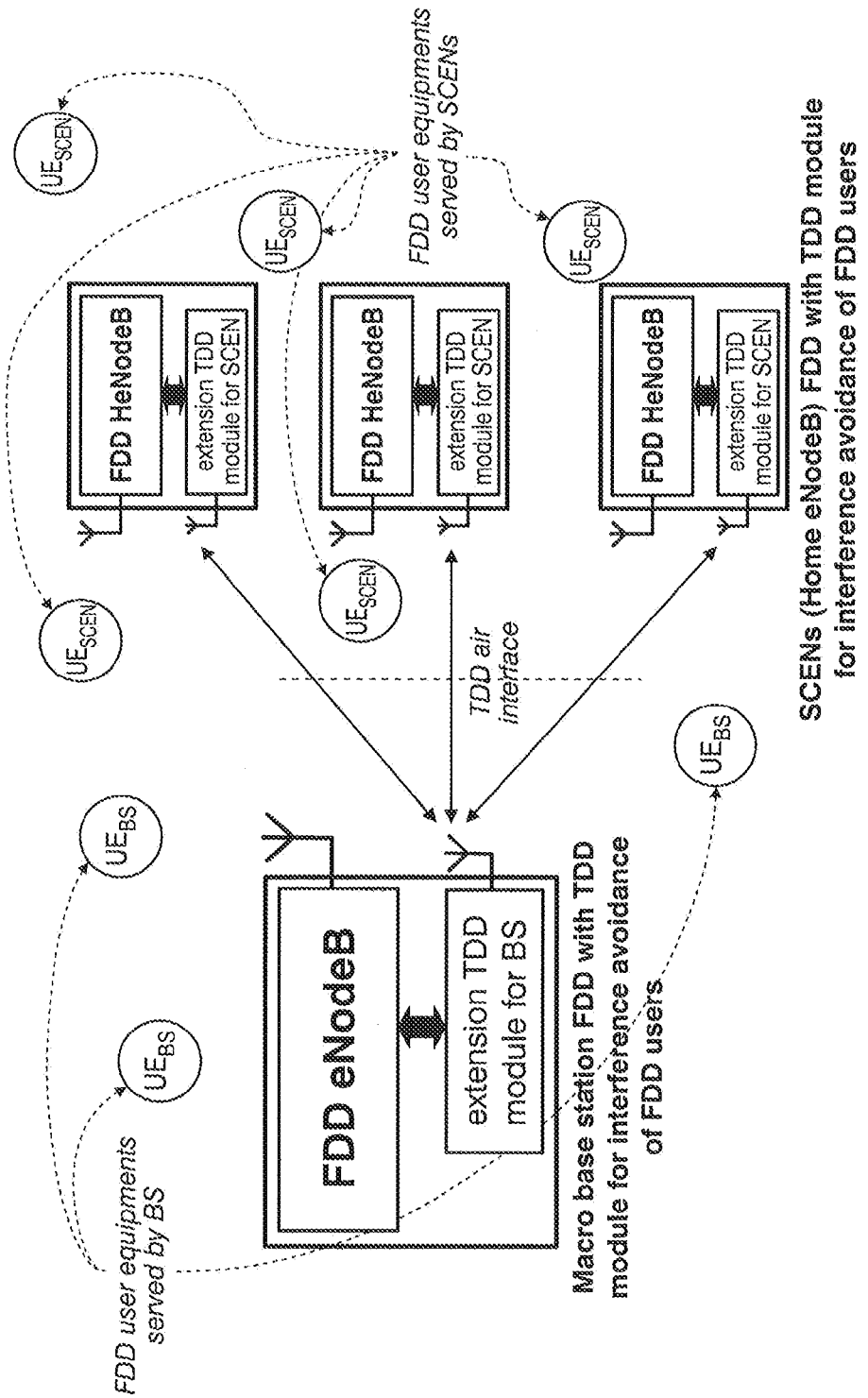
FIG. 6 shows the basic concept of Coordinated Advanced Block Scheduling according to the method of the invention, for an embodiment.

To better understand the added part of the invention on the general architecture of cellular networks, FIG. 6 shows, in a particular case of 4G system, the additional blocks (referred as Extension TDD modules) needed for the implementation of the interference avoidance mechanism proposed in the invention.

The idea is not to change the normal operation of the FDD users, but rather to include new modules in both FDD nodes (eNodeB and HeNodeBs) to coordinate the resource usage of these nodes to avoid interferences between the users of the eNodeB and the users of the HeNodeB. The coordination will be done through the TDD air interface, provided by these new modules, and trough the interchange of messages using the own TDD protocol in a master (module included in the BS) slave (module included in the SCEN) way. Of course, the definitive implementation and integration of the additional modules in the macro base station and in the SCEN will be a subject of the manufacturer of these equipments.

As said, the invention consists of the use of TDD communications to coordinate the FDD RR among SCENs and between SCENs and macro cells, as well as for the provision of synchronization reference for SCEN devices. The term TDD communications is defined as a standard TDD cellular system which payload capabilities are used for FDD system RR assignment. In the invention the TDD capacity usage is much smaller than that of the FDD system, typically, but not necessarily, 100 times smaller.

Figure 7:
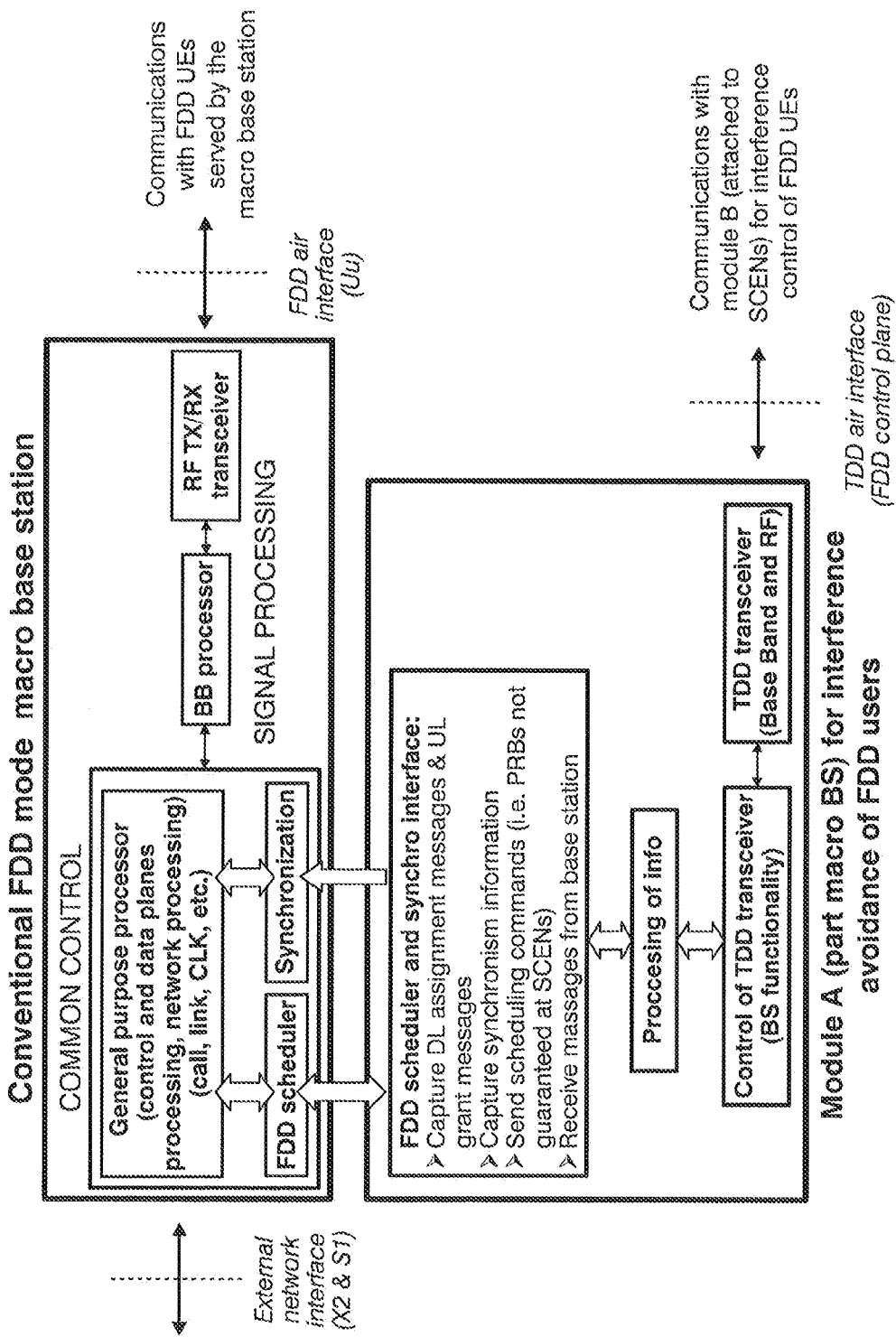
FIG. 7 shows a macro base station of the system of the second aspect of the invention comprising a coordinator module (module A), shown in detail, for implementing a Coordinated Advanced Block Scheduling, for an embodiment invention.
Figure 8:
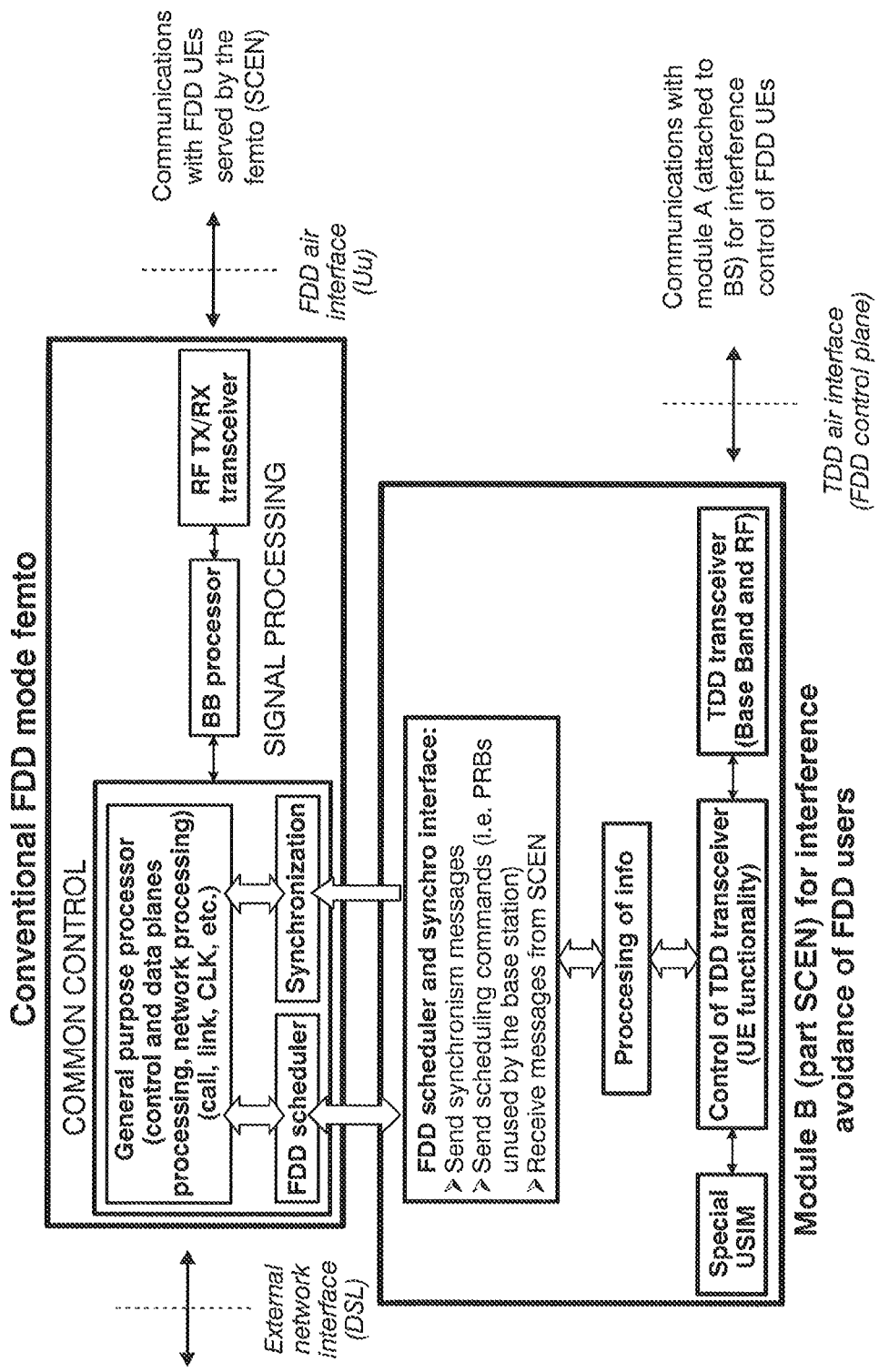
FIG. 8 shows a SCEN of the system of the second aspect of the invention comprising a coordinator module (module B), shown in detail, for implementing a Coordinated Advanced Block Scheduling, or an embodiment.

The coordination consists of the interchange of private messages between the base station and the SCENs using the TDD air interface implemented precisely by the additional modules proposed in the invention. The modules to be included are shown in FIG. 7 for the macro base station (module A, coordinator or master module) and in FIG. 8 for the SCEN (module B, coordinated or slave module), respectively. As can be seen in these figures, the additional modules have basically the following main blocks:

The interface block with the scheduler and synchronization functions of the FDD macro base station or FDD SCEN. This block in the module A will collect allocation messages and synchronization information of the FDD macro base station, for the synchronization of the TDD transceiver and the estimation of radio resources employed by the FDD users of the BS. On the other hand, this part in the module B will be in charge of the synchronism signals for the FDD SCEN as well as the communication with the scheduler of this node, reporting the radio resources unused by the FDD macro base station and therefore guaranteed for its own FDD users.

The information processing block. This block in the module A will process the information coming from the scheduler and synchronism unit of the macro FDD base station, in order to prepare the messages to be sent through the TDD air interface to the SCEN for interference coordination and synchronization purposes. In the module B, this block will be in charge to prepare the needed information for synchronism and scheduling of FDD SCEN. Note that for the dedicated version of the invention (bidirectional communication between BS and SCENs), the processing block contemplates also the preparation of scheduling commands towards the BS (module A) and the analysis of resources allocation preferences from the SCEN (module B).

The control block of the TDD transceiver. This block will control the performance of the TDD transceiver according to the information which should be received and transmitted through the TDD air interface in terms of the role of the module, assuming similar functionality to a TDD base station in the case of the module A and to a TDD UE in the case of the module B which will also includes the identification of the SCEN by means of an special USIM.

The TDD transceiver. This part will simply implement the operation of a conventional TDD transceiver, including the signal processing (base band) and the up/down conversion to/from RF according to the role of the module (in the module A as a TDD BS and in the module B as a TDD UE).

It is important to remark that the special TDD BS implemented in module A of the invention will not be connected to the core network and so will have a special cell identity as well as a particular initial configuration so that only the SCEN TDD users implemented in modules B will be able to access at this special TDD BS. Likewise the TDD block of the modules B will have some identities (configured on their special USIMs) known and accepted only for the special TDD BS implemented in module A. In other words, the TDD interface included in our invention is devoted only exclusively for connections between the module A (coordinator or master part) and the modules B (coordinated or slave part), and not for normal cellular radio communications according to the TDD standard.

Therefore, after switch on the module B of the HeNodeB or SCEN (coordinated node), this will subscribe to the module A of the eNodeB or macro BS (coordinator node), thus enabling the interchange of messages with information about RR usage and synchronization of the FDD users served by the macro BS and the SCEN.

The TDD signal from the macro cell is used as a synchronous (same frame duration that FDD) control channel, in which priority RR available for SCEN utilization on next FDD radio frame is indicated. It is important to note that the initial establishment of the TDD connection between module A and modules B could follow the identical attach and activation procedures specified in 3GPP for TDD standard, including all the necessary IEs (cell identities, user identities, specific parameters of the TDD mode, GPS position, etc.) in terms of the mode implemented in the invention (broadcast or dedicated basis as will be explained hereinafter). Once the TDD link is established, the module A will send the indication of the FDD resource blocks which can be used by the SCENs, which will receive and analyze them in their module B.

Figure 9:
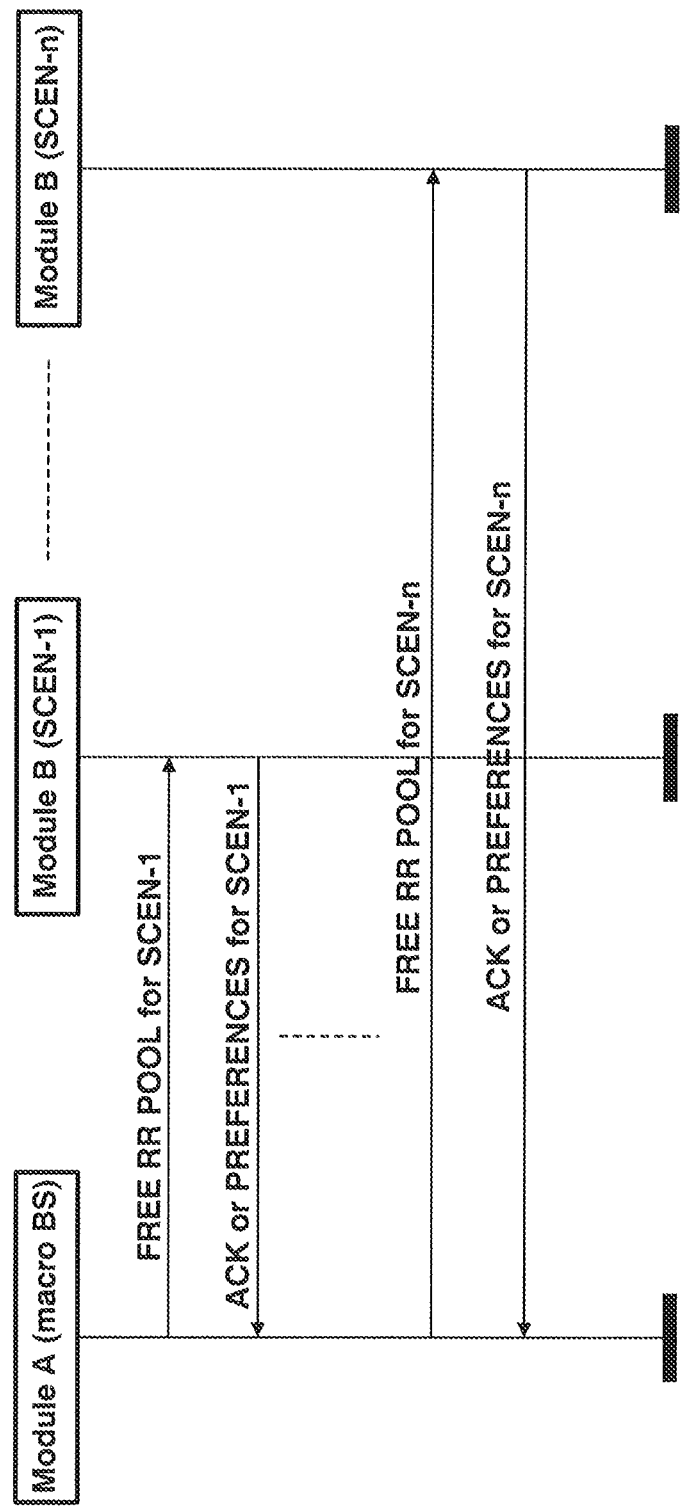
FIG. 9 shows the procedure followed for an embodiment of the method of the first aspect of the invention for a dedicated basis mode.

This indication, or control channel, could be sent:

In a dedicated basis, establishing a bidirectional link among different SCEN devices and its master macro cell (initially the one with best quality received signal), which indicates for each of them the specific RR that it could use in the next FDD (UL & DL) radio frame. The procedure for this mode was shown in FIG. 9 where once the SCEN has received the message of free FDD RR to be used, responds with an acknowledgment or preferences for next radio frame.

Figure 10:
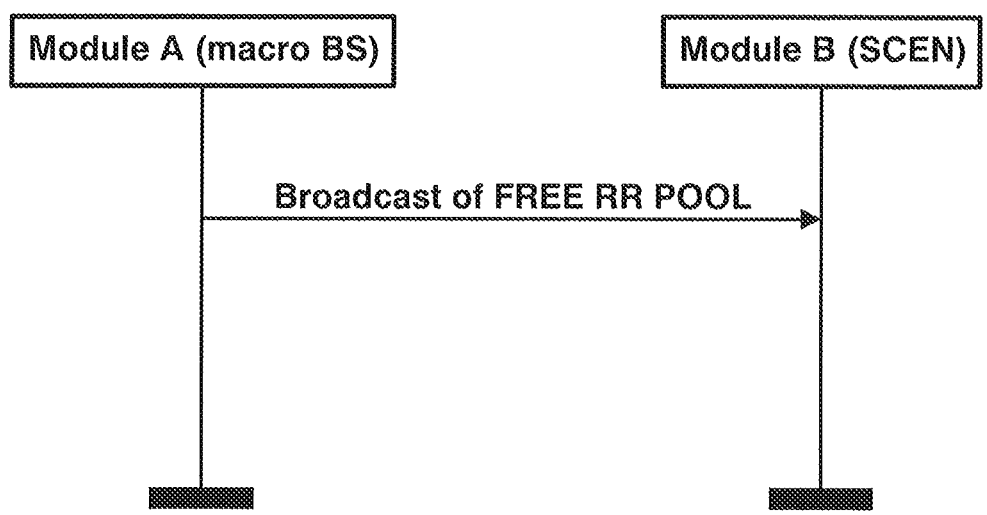
FIG. 10 shows the procedure followed for an embodiment of the method of the first aspect of the invention for broadcast mode.

In a broadcast way, the control information is sent by the macro cell to all SCEN under its TDD coverage, to inform them which RR will not be priority used by the macro cell in the next FDD frames (UL & DL). Accordingly with it, forecast of free RR macro cell capacity needs to satisfy the traffic expected in next FDD frame. The procedure for this mode is shown in FIG. 10. It is worthy to note that since TDD coverage is expected to be higher than FDD coverage, if other macro cells are under TDD coverage this invention could be used instead of X2 interface for Inter Cell Interference Coordination (ICIC) with the advantage of being synchronous.

In a mixed way, sending general broadcast of RR availability, and specific indications of usage to several SCEN with which a link has been established.

Therefore, for broadcast control channel, macro cells (module A) only need to add TDD transmission capabilities and SCEN nodes (modules B) only need to add TDD reception capabilities, and the information could be carried in any specified broadband way, that do not need the SCEN nodes to be registered by the macro cell.

On the other hand, for a complete control channel establishment, both macro and SCEN nodes need to include a complete TDD transceiver synchronized with its current FDD transceiver. In this last case SCENs will be a classical UE from the macro point of view, and therefore the SCEN needs to be identified and registered in the macro TDD system.

The broadcast approach is easier, and therefore it lowers the cost of the invention deployment, but with this approach only macro cell to SCEN coordination could be achieved. On the other hand, the deployment of full TDD transceiver capabilities on both macro and SCEN nodes will enable full macro SCEN coordination and also a SCEN to SCEN coordination at the price of highest nodes cost.

The kind of indicator sent in TDD to the SCEN could be deployed with different approaches, being as an example the most straightforward way in LTE to use something similar to the IE currently standardized Relative Narrowband Transmit Power (RNTP). This indicator is used in the ICIC mechanisms under the X2 interface, and could be made available in a synchronized way not only to neighbours macro cells (eNodeBs) but also to all SCENs deployed in the coverage area, as has been previously detailed.

Figure 11:
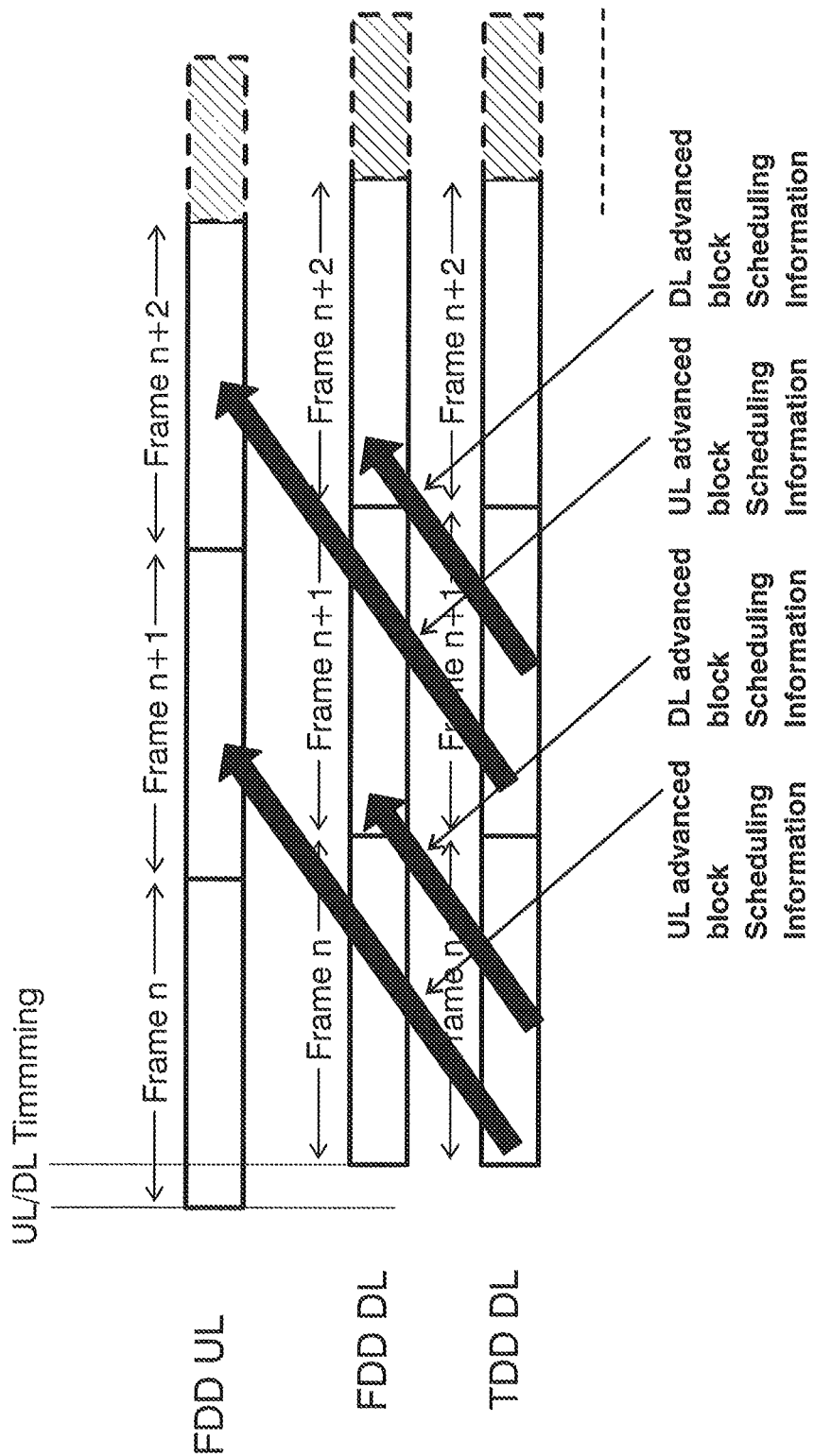
FIG. 11 shows the pre-assigned block information on frame structure sent as messages from the macro base station to the SCEN, for an embodiment of the method of the first aspect of the invention.

In short the functionalities of the proposed innovation are the following:

1. Avoid SCEN to macro cell interference. Macro cell will coordinate available RR in the coverage area, by means of indicating, in a broadcast way in each TDD frame, the block of its RR that could be shared in the next FDD UL & DL radio frames (as shown in FIG. 11). This indication should be based on the traffic forecast on macro cell and will be obviously taken into account in the operation of the macro scheduler on the next frame, in order to avoid interferences.

Of course this same idea could be used with different frame indication, namely indicating in a given TDD frame the RR usage in a FDD frame different of the next, but this will be more inefficient, even when will provide advantage compared with the current state of the art.

It is worth to be noted that this TDD identification do not only enable the exposed ICIC mechanisms, but all in all it is possible to use it as enabler for controlling the access to operator FDD bandwidth by SCEN nodes (not always under operator's control). That means that based on SCEN TDD identification and operator security or commercial policies, even not FDD radio resource could be assigned to unauthorized SCEN nodes, avoiding them to use cellular operator radio resources on unauthorized form.

2. Avoid SCEN to SCEN interference. If the full TDD link is established among macro cell and different SCENs, since the location of the SCEN could be known (or can be estimated by different state of the art mechanism based on TDD received signals), a personalized RR assignation to different SCEN devices could be signalled from the macro cell, avoiding SCEN to SCEN interference, and therefore improving the RR usage.

3. Implementable on current and future networks. The proposed invention is fully compatible with current state of the art of pure FDD networks deployment, since no modification of the FDD standard is needed, being therefore straightforward to deploy a mixed network, in which the proposed mechanism is only implemented in the locations in which high density of SCEN is foreseen, and therefore the probability of interferences is high.

4. High indoor coverage of control signals. Since TDD signals do not require a high communication bandwidth, TDD transmission could be constrained to the smallest frequency bandwidth allowed by the TDD standard. This allows the TDD signal to be radiated with a spectral density higher than that of FDD, for the same amount of total radiated power, and therefore to control and synchronize some SCENs deployed out of FDD coverage.

5. Provides on the air synchronization. The radiated signal by TDD module of the macro cell will have, as previously shown, better coverage than current FDD signal, providing therefore a more reliable source for on the air time and frequency synchronization for SCEN devices.

Figure 12:
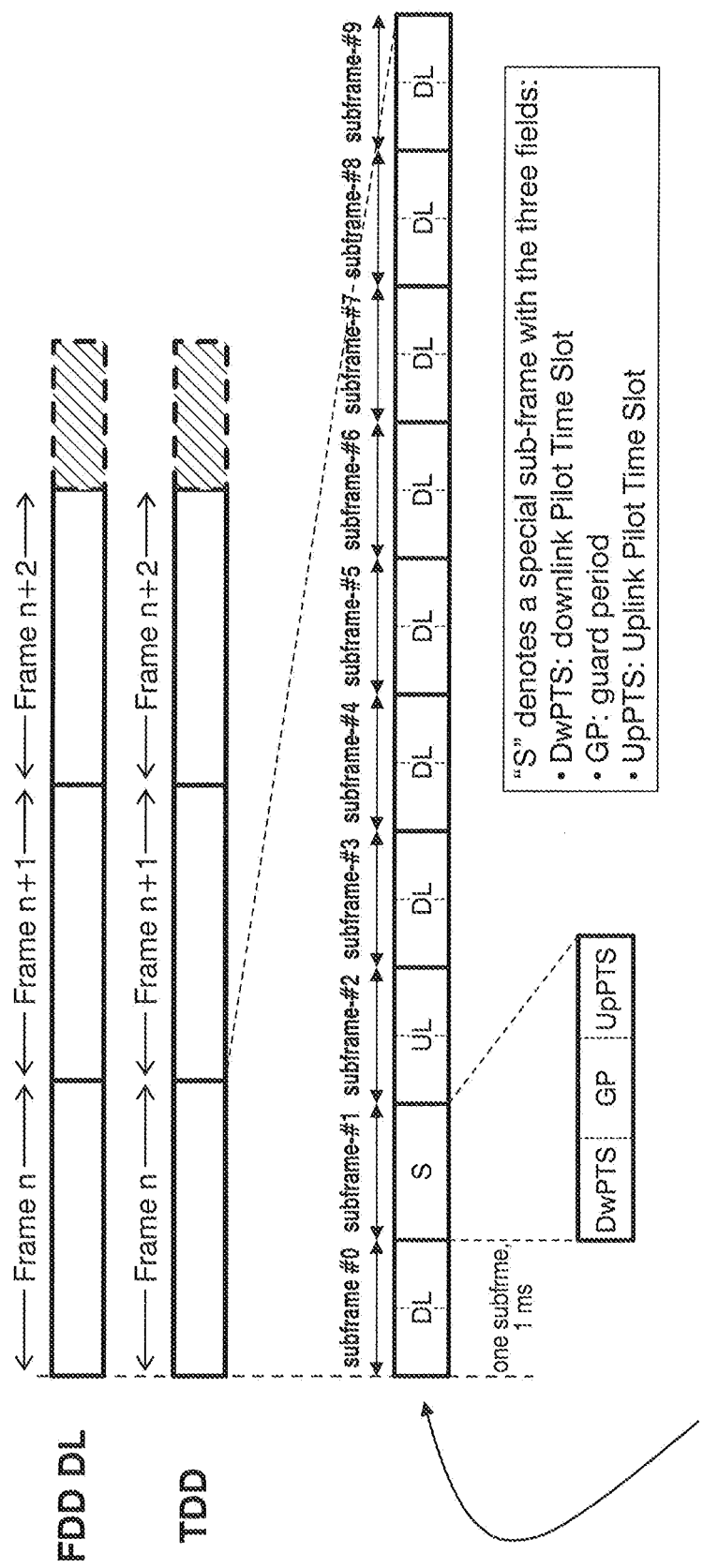
FIG. 12 shows the available resources for TDD radio frame according to UL/DL configuration type 5 according to 3GPP.

Concerning the amount of information bits needed for sending the indication of free resources from the module A, this of course will depend on the bandwidth of the FDD signal and in definitive of the number of PRBs per radio frame that have to be indicated (from 60 PRBs for a FDD signal of 1.4 MHz to 1000 PRBs for a FDD signal of 20 MHz), and how they are clustered, being one possible extreme to send only assignments of time slots in a ABS approach. However, assuming that the TDD radio frame uses a DL/UL configuration as shown in FIG. 12, and the lowest bandwidth (1.4 MHz), around 4608 information bits (QPSK modulation and ⅓ coding rate) will be available for transmitting the message with the indication of the PRBs which can be used.

Figure 13:
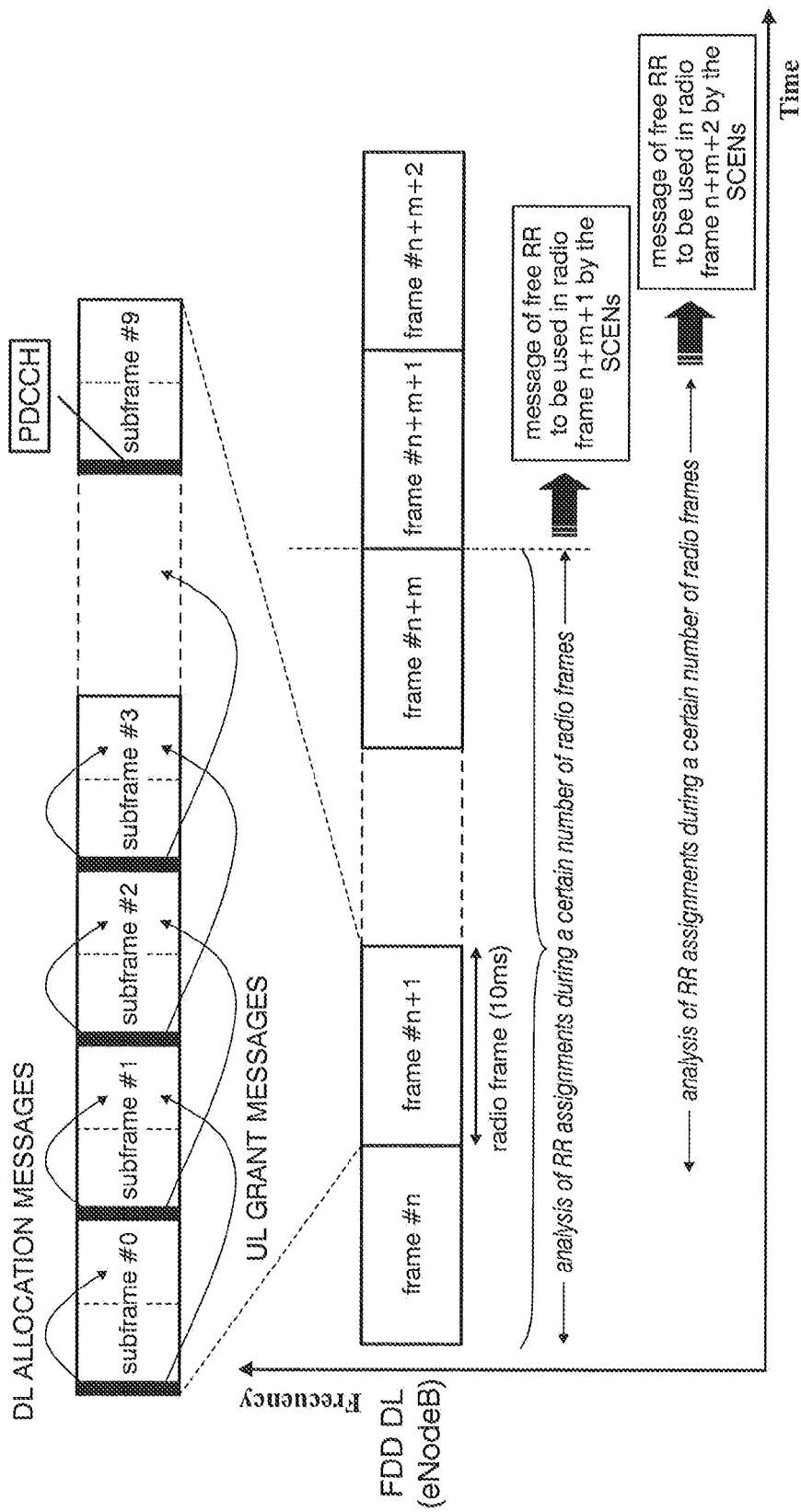
FIG. 13 shows the generation of the messages for interference coordination in the method of the first aspect of the invention for LTE systems.

Finally, it is important to outline how to generate the message of RR usage which will be sent from the module A to the modules B, indicating the free RR to be used by the SCENs. For example in the case of LTE system, the indication of FDD RRs free to use, will be elaborated analyzing as FIG. 13 shows, the DL allocation messages and UL grant messages produced by the scheduler of the eNodeB (macro BS) during a certain number of radio frames previous to the elaboration of the indication. Note that in LTE, the resources scheduling is performed by sub-frame basis and it is transmitted by the PDCCH (Physical Downlink Control Channel) in the first OFDM symbols of each sub-frame.

Advantages of the Invention

The main benefit of this invention, as it has been described so far, is the provision of a coordinated, advanced and synchronized ICIC mechanism that could be gradually deployed on current FDD cellular networks, to coordinate RR usage, avoiding interference in the coverage area among different radio network nodes (macro cells and Short Range Coverage Extensions Nodes as picocells, femtocells, relays, etc.).

In short, the more remarkable advantages of this invention can be summarized in the following points:

1. Preventing interference with other network nodes by means of using of TDD communications for broadcasting of advanced information on RR usage on FDD (UL &DL) by macro cells.

2. Mechanism for taking into account SCEN devices requirements, characteristics and physical position, as well as interference information reported by the SCEN nodes, by means of using a special TDD control channel for RR coordination of several SCEN nodes, sending the SCEN RR assignment, for devices in the macro coverage area, in a master slave way.

3. It is fully compatible with current state of the art of pure FDD networks deployment, since no modification on the FDD standard is needed, being therefore straightforward to deploy a mixed network, in which the proposed mechanism is only implemented in the locations in which high density of SCEN is foreseen.

4. High indoor coverage of control signals. Since TDD signals do not require a high communication bandwidth, TDD transmission should be constrained to the smallest frequency bandwidth allowed by the TDD standard. This allows the TDD signal to be radiated with a spectral density higher than that of FDD, for the same amount of total radiated power, and therefore to control and synchronize SCENs deployed out of FDD coverage.

5. Provides on the air synchronization. The macro cell TDD radiated signal will have, as previously shown, better coverage than current FDD signal, providing therefore a more reliable source for on the air time and frequency synchronization of SCEN devices.

6. In addition to the frequency synchronism, the invention enables the SCEN to obtain time synchronism improving interferences management, since there is a perfect alignment between the radio frames of base station and SCENs. This way, the interferences between the FDD users of the macro BS and the SCEN come only from the usage of the same frequency in the same time slot, allowing perfect interference coordination among the macro BS and the SCENs.

7. It makes easier the power control algorithms in SCENs. Usually the power control in SCENs nodes is dynamically defined, depending on the service required and the SINR. Therefore, if the interferences are avoided the SINR will be higher and steadier, facilitating the power control function.

8. Use of TDD signal to send paging messages for FDD users under SCENs coverages. Due to the high volume of SCENs deployment, it is well-known that paging messages are a big burden for the SCEN system, which may cause a huge signalling redundancy for the large number of SCEN involved.

9. Use of TDD control signal like a control interface for handover among macro cell and SCEN. Cell handover enables the UE to transfer the service among its serving cell and the target cell without terminating the service. Currently this kind of handover is not possible among macro cells and SCENs for active communications. Therefore it is in fact a way to include all X2 alike information in a synchronized way.

A person skilled in the art could introduce changes and modifications in the embodiments described without departing from the scope of the invention as it is defined in the attached claims.

ACRONYMS AND ABBREVIATIONS

3G THIRD GENERATION CELL-PHONE TECHNOLOGY
3GPPP THIRD GENERATION PARTNERSHIP PROGRAM
4G FOURTH GENERATION CELL-PHONE TECHNOLOGY
ABS ALMOST BLANC SUBFRAME
ASE AREA SPECTRAL EFFICIENCY
AP ACCESS POINT
BB BASE BAND
BS BASE STATION
CDMA CODE DIVISION MULTIPLE ACCESS
CN CORE NETWORK
DL DOWNLINK
DSL DIGITAL SUBSCRIBER LINE
EPC EVOLVED PACKET CORE
E-UTRAN EVOLVED UNIVERSAL TERRESTRIAL RADIO ACCESS NETWORK
FDD FREQUENCY DIVISION DUPLEX
FDMA FREQUENCY DIVISION MULTIPLE ACCESS
GGSN GATEWAY GPRS SUPPORT NODE
GMSC GATEWAY MOBILE SWITCHING CENTER
GSM GLOBAL SYSTEM FOR MOBILE COMMUNICATIONS
GPRS GENERAL PACKET RADIO SERVICE
GPS GLOBAL POSITIONING SYSTEM
GSM GLOBAL SYSTEM FOR MOBILE COMMUNICATIONS
HARQ HYBRID AUTOMATIC REPEAT REQUEST
HSPA HIGH SPEED PACKET ACCESS
HW HARDWARE
ICIC INTER CELL INTERFERENCE COORDINATION
IE INFORMATION ELEMENT
IEEE INSTITUTE OF ELECTRICAL AND ELECTRONICS ENGINEERS
IMS IP MULTIMEDIA SUBSYSTEM
IP INTERNET PROTOCOL
LTE LONG TERM EVOLUTION
MME MOBILITY MANAGEMENT ENTITY
MSC MOBILE SWITCHING CENTER
OFDMA ORTHOGONAL FREQUENCY DIVISION MULTIPLE ACCESS
OSI OPEN SYSTEM INTERCONNECTION
P2P PEER TO PEER
PDN PACKET DATA NETWORK
PRB PHYSICAL RESOURCE BLOCK
QOS QUALITY OF SERVICE
QPSK QUADRATURE PHASE SHIFT KEYING
RAN RADIO ACCESS NETWORK
RAT RADIO ACCESS TECHNOLOGY
RNC RADIO NETWORK CONTROLLER
RNTP RELATIVE NARROWBAND TRANSMIT POWER
RR RADIO RESOURCE
RRC RADIO RESOURCE CONTROL
RRM RADIO RESOURCE MANAGEMENT
RS RELAY STATION
SC-FDMA SINGLE CARRIER FREQUENCY DIVISION MULTIPLE ACCESS
SCEN SHORT RANGE COVERAGE EXTENSIONS NODES
SGSN SERVICE GPRS SUPPORT NODE
SINR SIGNAL TO INTERFERENCE PLUS NOISE RATIO
SW SOFTWARE
TDD TIME DIVISION DUPLEX
TDMA TIME DIVISION MULTIPLE ACCESS
UE USER EQUIPMENT
UL UPLINK
USIM UNIVERSAL SUBSCRIBER IDENTITY MODULE
UTRAN UNIVERSAL TERRESTRIAL RADIO ACCESS NETWORK
WCDMA WIDEBAND CODE DIVISION MULTIPLE ACCESS

REFERENCES

[1] IEEE Communications Magazine April 2009 "Interference Coordination and Cancellation for 4G Networks" by W. J. Song et al.

[2] 3 Gpp TS 36.423 "Technical Specification Group Radio Access Network; Evolved Universal Terrestrial Radio Access Network (E-UTRAN); X2 application protocol (X2AP)"
[3] 3 Gpp TS 36.133 "E-UTRA; Requirements for support of radio resource management"*
[4] 3 Gpp TS 36.921 "Evolved Universal Terrestrial Radio Access (E-UTRA); FDD Home eNode B (HeNB) Radio Frequency (RF) requirements analysis"
[5] 3 Gpp TS 36.211 "Physical Channels and Modulation"
[6] IEEE 1588 "Standard for A Precision Clock Synchronization Protocol for Networked Measurement and Control Systems".

The invention claimed is:

1. A method for avoiding interferences in Frequency Division Duplex operating areas by coordinating use of radio resources between different network elements including at least one macro base station and short range coverage extension nodes (SCENs) deployed within a coverage area of the at least one macro base station and operating in Frequency Division Duplex (FDD) mode, including sending messages between at least part of the network elements, the method comprising:

performing the sending of the messages using a synchronized Time Division Duplex (TDD) air interface mode between the SCENs and a radio network controller (RNC) common for several macro base stations for a 3G system, or between the SCENs and at least one macro base station for a 4G system;

sending the messages either unidirectionally from the at least one macro base station, or from the RNC, towards the SCENs, by broadcasting or bidirectionally, by messages interchanging, between the at least one macro base station, or the RNC, and each of the SCENs, by corresponding dedicated channels, wherein to avoid interferences in downlink and uplink FDD communications the sending of messages comprises sending through the synchronized TDD air interface, by sending a list of FDD radio resources that could be used in a next radio frame; and transferring, from the at least one macro base station to the SCENs, unused or guaranteed radio resources on a radio frame by radio frame basis, using the list, enforcing the SCENs to use the unused or guaranteed radio resources for service end users;

wherein a TDD protocol used in the TDD air interface is deployed in a frequency band different from FDD uplink and downlink frequency bands.

2. The method of claim 1, further comprising using the TDD air interface for synchronization of any of the SCENs with the macro base station in frequency and in time, in order to align radio frames of the macro base station and SCENs to avoid interferences.

3. The method of claim 1, comprising, when the messages interchanging is performed bidirectionally, using the TDD air interface as an identifier of a SCEN device, enabling application of operator bandwidth access policies, at different locations and timeframes.

4. The method of claim 1, wherein the sending of messages is done:

unidirectionally from the at least one macro base station, or from the RNC, towards the SCENs, by broadcasting, for messages related to general information about radio resources availability; and bidirectionally between the at least one macro base station, or the RNC, and each of the SCENs, by corresponding dedicated channels, for messages related to specific indication of usage of the radio resources.

5. The method of claim 1, comprising assigning the macro base station, based on knowledge of the macro base station about a geographical position of each SCEN, the unused or guaranteed radio resources in a personalized manner for each SCEN, in order to avoid SCEN to SCEN interferences.

6. The method of claim 1, further comprising estimating and reserving at least part of the at least one macro base station unused radio resources to include in the list for exclusive use of users served by the SCENs.

7. The method of claim 6, further comprising using a time advanced pre-schedule, based on previous scheduling information analysis generated by a resources scheduler of the at least one macro base station, in the performing of the estimating.

8. The method of claim 6, further comprising establishing, using the air TDD interface, a P2P communication among the at least one macro base station and the SCENs in the coverage area of the macro base station, providing a two way mechanism for interchange of signalling information in a master slave way, being radio resources usage commanded by the macro base station, and sending, messages of the SCENs to the macro base station, when the sending of messages is a bidirectional messages interchanging, an acknowledgement signal and/or a message indicating preferences for a next radio frame and/or reports on performance of an assigned radio resources usage.

* * * * *